United States Patent [19]

Ooishi

[11] Patent Number: 4,955,446
[45] Date of Patent: Sep. 11, 1990

[54] HYDRAULIC POWER STEERING APPARATUS

[75] Inventor: Hiroshi Ooishi, Osaka, Japan
[73] Assignee: Koyo Seiko Co., Ltd., Osaka, Japan
[21] Appl. No.: 295,640
[22] Filed: Jan. 10, 1989
[30] Foreign Application Priority Data Jan. 26, 1988 [JP] Japan .................................. 63-15228

[51] Int. Cl.⁵ .............................................. B62D 5/08
[52] U.S. Cl. ...................................... 180/143; 91/434
[58] Field of Search ................... 180/143, 142; 91/434, 91/375 A, 371, 372, 373

[56] References Cited
U.S. PATENT DOCUMENTS

| | | | |
|---|---|---|---|
| 4,000,785 | 1/1977 | Nishikawa et al. | 180/143 |
| 4,034,825 | 7/1977 | Adams | 180/143 |
| 4,637,484 | 1/1987 | Ijiri et al. | 180/142 |
| 4,784,235 | 11/1988 | Ijiri et al. | 180/142 |
| 4,840,244 | 6/1989 | Brouckosu | 180/143 |

Primary Examiner—Charles A. Marmor
Assistant Examiner—Alan M. Kagen
Attorney, Agent, or Firm—Townsend and Townsend

[57] ABSTRACT

A hydraulic power steering apparatus having a hydraulic cylinder as a source for generating a force assisting a steering force, and comprising a directional control valve which switches the feeding direction of pressured oil to the hydraulic cylinder, and a constraining device which constrains its switching operation responsive to the vehicle speed, characterized in that an oil pressure control valve for controlling oil pressure fed to the directional control valve and constraining device is controlled by pressure of a vehicle speed sensor pump which develops oil pressure corresponding to the vehicle speed, and in that a sudden change of a constraining force caused by external disturbance signals such as electromagnetic waves is prevented and the constraining force corresponding to the vehicle speed can be obtained, by introducing oil pressure, which becomes higher or lower responsive to changes of the vehicle speed, into the constraining device to generate the constraining force responsive to the oil pressure.

8 Claims, 6 Drawing Sheets

HYDRAULIC POWER STEERING APPARATUS

BACKGROUND OF THE INVENTION

1. Field of the Invention

The present invention relates to a hydraulic power steering apparatus using a hydraulic cylinder as a source for generating a force assisting a steering force, more particularly, it relates to a power steering apparatus including a constraining device which constrains switching operation of a directional control valve for switching the feeding direction of pressured oil to the hydraulic cylinder corresponding to the vehicle speed.

2. Description of the Prior Art

A hydraulic power steering apparatus designed to generate a force assisting a steering force by a hydraulic cylinder disposed in a steering mechanism and to reduce a force required for steering operation, is so constructed that, the feeding direction of pressured oil to two oil chambers in the hydraulic cylinder are switched by a directional control valve disposed between the hydraulic cylinder and a hydraulic pressure source according to the operating direction of a steering wheel.

In the directional control valve, an input shaft which rotates interlockingly with the steering wheel and an output shaft which rotate interlockingly with operation of the steering mechanism are connected coaxially through a tortion bar, and a plurality of elongated grooves extending axially are formed on the peripheral surface near the connecting end of the input shaft to constitute a valve body. While, a cylindrical casing provided with the same number of elongated grooves as the aforesaid elongated grooves, extending axially on its inner circumferential surface is secured to the connecting end of the output shaft coaxially. The valve body is inserted rotatably into the casing so as to be positioned such that their elongated grooves are arranged in a zigzag fashion. The elongated grooves of the casing are brought in communication with two oil chambers in the hydraulic cylinder alternately, and the elongated grooves of the valve body are brought in communication with the oil pressure source and oil tank alternately. Corresponding to distortion produced on the torsion bar according to the steering wheel operation, the relative angular displacement is produced between the valve body and the casing. At this time, gap areas between the elongated groove of the valve body which is in communication with the hydraulic pressure source, and the elongated grooves of the casing adjacent to elongated groove of the valve body become larger on one side and smaller on the other side, so that a pressure difference is developed between two elongated grooves of the casing and between two oil chambers of the hydraulic cylinder which are respectively in communication with the former. By this pressure difference, the hydraulic cylinder is operated to generate a force assisting the steering force in the direction corresponding to the operating direction of the steering wheel.

Now, a force required for steering operation at manual steering corresponds to a resistance force from the road surface acting on wheels, and a large operating force is necessary at low speed driving and standstill. While, at high speed driving, the steering operation can be effected by a small operating force. Thus, in a power steering apparatus, characteristics which generates as large force assisting the steering force as possible is required to reduce the force required for steering operation at low speed driving and standstill. On the other hand, at high speed driving, characteristics which hardly generates any force assisting the steering force is required to provide appropriate rigidity to the steering wheel and to improve the rectilinear stability. However, in the power steering apparatus having the aforesaid construction, correlation between the operating force acting on the steering wheel and the force assisting the steering force produced by the hydraulic cylinder is subject to the correlation between the operating force acting on the vehicle is steered a torsional angle produced on the torsion bar thereby. When selecting torsional characteristics of the torsion bar to realize the characteristics aforementioned at the low speed driving and standstill, vehicle is steered by a small operating force applied to the steering wheel at high speed driving and the rectilinear stability is deteriorated. While, when determining the distortional characteristics to realize the characteristics aforementioned at high speed driving, there is a difficulty in obtaining the sufficient assisting steering force at low speed driving and standstill.

In order to solve the difficulty, a power steering apparatus using a torsion bar having torsional characteristics whereby the sufficient assisting steering force is obtained at low speed driving and standstill, and at the same time, provided with a constraining device (hydraulic reaction force device) between the valve body and the casing of the directional control valve for applying a constraining force corresponding to the vehicle speed as disclosed, for example, in Japanese Patent Application Laid-Open No. 61-200063 (1986), has been proposed. By constraining the aforesaid relative angular displacement by the constraining device to make switching operation of the directional control valve difficult at high speed driving, two contradictory characteristics may be realized.

In the constraining device, to the cylindrical portion formed by extending end portions of the casing, a plurality of plungers are mounted slidably and radially with their tips directing inwardly. The tips of the plungers are pressed against the peripheral surface of the valve body by oil pressure introduced into the base portion side of the plungers so as to apply the constraining force.

Into the constraining device, successively through a variable throttle whose throttle opening is adjusted proportional to the vehicle speed detected by a speed sensor and a fixed throttle having a fixed throttle opening, oil pressure between the variable throttle and the fixed throttle in an oil pressure circuit extending from the oil pressure source to the oil tank, which changes proportional to the vehicle speed is introduced, thereby the constraining force corresponding to the vehicle speed is obtained.

However, in the conventional power steering apparatus having the constraining device thus constructed, there is a possibility that a control portion which adjusts the throttle opening of the variable throttle in response to the output signal from the speed sensor is subjected to malfunction by reacting to the external disturbance signals such as electromagnetic waves and produces an error control signal. By the malfunction, the throttle opening of the variable throttle which is adjustable responsive to the output signal from the speed sensor, or the constraining force applied by the constraining device does not respond to the vehicle speed, thereby not only the rigidity of the steering wheel is changed suddenly and the steering sensation is worsened, but if the steering wheel becomes lighter suddenly during high speed driving, there has been the possibility of incurring an unexpected accident.

SUMMARY OF THE INVENTION

The present invention has been devised to solve aforesaid problems, therefore, it is an object thereof to provide a hydraulic power steering apparatus, in which pressure applied to a hydraulic cylinder for assisting steering and a constraining device is controlled in response to pressure from a speed sensor pump which develops the pressure responsive to the vehicle speed, to prevent reliably nonresponse of the constraining force applied by the constraining device and the vehicle speed and to eliminate a sudden change of a steering sensation.

It is another object of the present invention to provide a hydraulic power steering apparatus, in which maximum pressure of a pressure control valve which controls the pressure applied to the constraining device is changed according to the vehicle speed, to give an appropriate rigidity corresponding to the vehicle speed to the steering wheel and to increase a weight of the steering wheel as the vehicle speed increases for obtaining a comfortable steering sensation.

For the purpose of attaining these objects, a power steering apparatus for motor vehicle according to the present invention comprising, a directional control valve having a casing and a valve body which rotate relatively according to steering operation, and switching the feeding direction of pressured oil to a hydraulic cylinder which generates a force assisting steering force according to the relative rotation, and a constraining device operated by pressured oil so as to apply a constraining force corresponding to the oil pressure between the casing and the valve body to constrain the relative rotation, is characterized by including a vehicle speed sensor pump which is driven at a speed proportional to the vehicle speed and develops oil pressure corresponding to the rotational speed, and an oil pressure control valve, in which a cylindrical main spool sliding axially responsive to oil pressure fed to the constraining device is inserted into a cylindrical casing provided with communicating ports which are in communication respectively with the directional control valve and the constraining device, an auxiliary spool sliding axially responsive to the oil pressure developed by the speed sensor pump is inserted into the main spool, and variable throttles communicating separately with the two communicating ports is formed between the two spools such that, the opening area of the variable throttle is changed responsive to the relative displacement between the two spools in such a manner that, when one side becomes larger the other side becomes smaller to control the oil pressure fed to the directional control valve and the constraining device. In the power steering apparatus of the present invention, the auxiliary spool of the oil pressure control valve is moved corresponding to the vehicle speed detected by the speed sensor pump, and the opening area of the variable throttle communicating with the constraining device is changed to introduce oil pressure, which becomes higher or lower corresponding to the vehicle speed, into the constraining device, and the relative rotation between the valve body and the casing of the directional control valve is constrained by the constraining force produced by the constraining device responsive to the oil pressure.

The above and further objects and features of the invention will more fully be apparent from the following detailed description with accompanying drawings.

DESCRIPTION OF THE PREFERRED EMBODIMENTS

Figure 1:
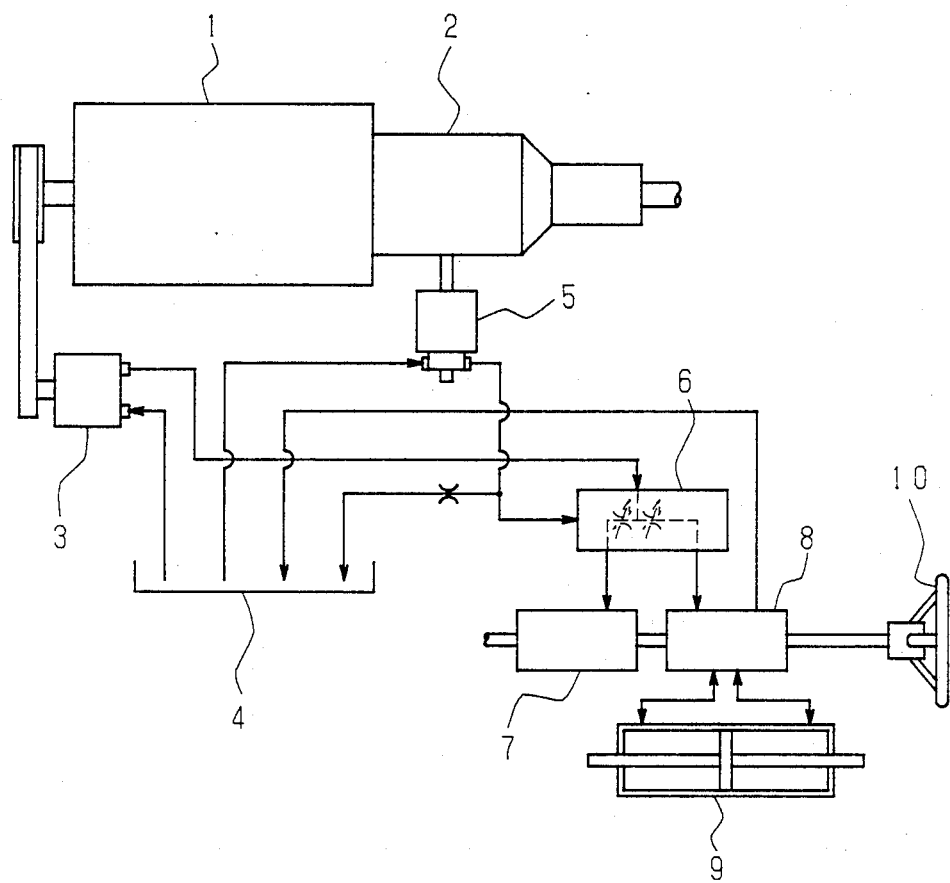
FIG. 1 is a hydraulic system diagram of a power steering apparatus according to the present invention.

In the following, the present invention will be explained in detail according to the drawings showing the embodiment. FIG. 1 is a hydraulic systematic diagram of a power steering apparatus according to the present invention.

In the figure, reference numeral 1 indicates an engine and 2 denotes a transmission gear coupled to the engine 1 via a clutch not shown. Numeral 3 denotes a hydraulic pump driven by the engine 1 through a belt, which sucks oil in an oil tank 4, increasing the pressure up to a predetermined pressure and discharges an operating oil for power steering apparatus. Numeral 5 indicates a vehicle speed sensor pump disposed on an output shaft of the transmission gear 2 so as to be rotated interlockingly for sucking the oil in the oil tank 4 to increase the pressure up to pressure corresponding to revolutions of the output shaft or the vehicle speed. The operating oil discharged from the hydraulic pump 3 is fed into a directional control valve 8 for switching the feeding direction of pressured oil responsive to operation of the steering wheel 10 via an oil pressure control valve 6 featuring the present invention. Switching operation of the directional control valve 8 is effected in such a manner that, when the steering wheel 10 is rotated by an steering force applied thereto, pressured oil fed from the hydraulic pump 3 is introduced into one of two oil chambers of a hydraulic cylinder 9 provided in a steering mechanism, on the side corresponding to the direction of the steering force, while oil in the other oil chamber is circulated to the oil tank 5, to generate a force assisting a steering force in the direction corresponding to the operating direction of the steering wheel 10 in the hydraulic cylinder 9. When the steering force is not applied to the steering wheel 10 which is maintained in a rectilinear state, the pressured oil fed from the hydraulic pump 3 is circulated to the oil tank 4 without being fed to any of the oil chambers of the hydraulic cylinder 9 so as not to generate force assisting the steering force therein. As to be described later, the constraining device 7 constructed coaxially with the directional control valve 8 generates a constraining force corresponding to the oil pressure introduced thereinto from the hydraulic pump 3 via the oil pressure control valve 6, and constrains switching operation of the directional control valve 8 aforementioned. The oil pressure introduced into the constraining device 7 is adapted to be adjusted by operation of the oil pressure control valve 6 to be described later.

Figure 2:
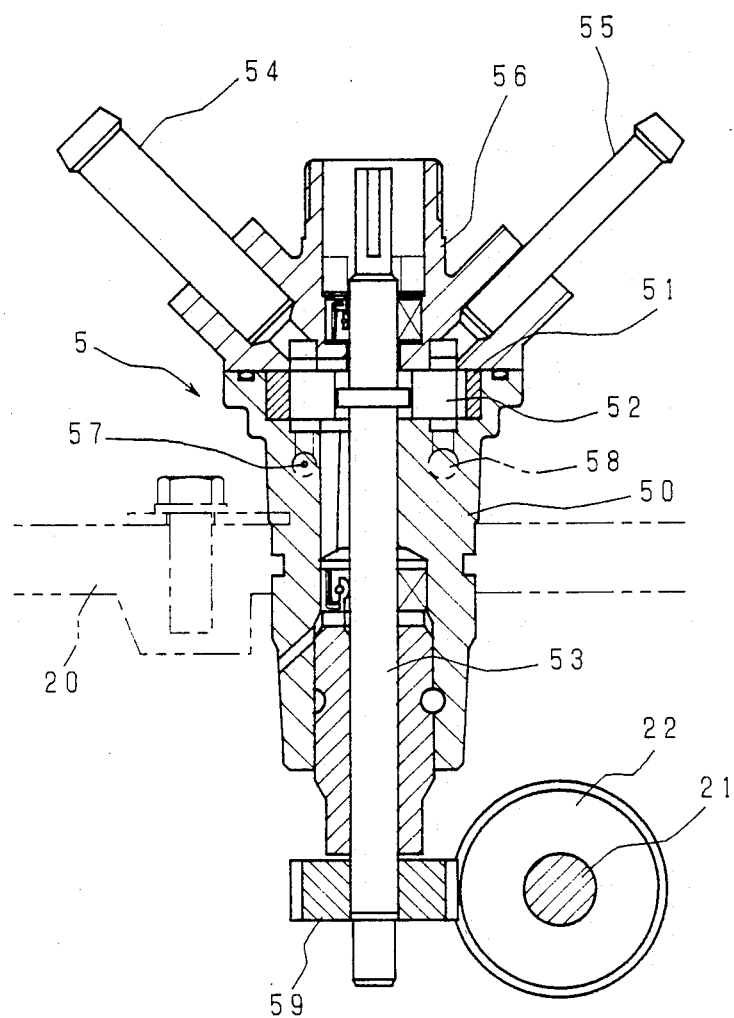
FIG. 2 is a longitudinal sectional view showing one example of a vehicle speed sensor pump.

FIG. 2 is a longitudinal sectional view showing one example of the vehicle speed sensor pump 5 disclosed in Japanese Utility Model Publication No. 60-38219 (1985) by the applicant of the present invention.

The vehicle speed sensor pump 5 shown in the figure takes the form of a trochoid pump, in which, while an outer rotor 51 of a short cylindrical shape having an inner circumference being eccentrical relative to an outer circumference by a predetermined quantity, and provided with a predetermined tooth form surface on its inner circumferential surface is inserted rotatably around the center of axis into a large diameter portion of a cylindrical housing 50, an inner rotor 52 provided with a tooth form surface engaged with the aforesaid tooth surface, and having the number of teeth less by one tooth on the peripheral surface of the inner rotor 52 is inserted into the outer rotor 51 such that a part of respective tooth surfaces engage with each other, and the inner rotor 52 is secured coaxially adjacent to one end portion of a rotary shaft 53 supported on the housing 50 rotatably around the center of axis, and furthermore, a suction and discharge plate 56, to which a suction pipe 54 and a discharge pipe 55 are fixed, is secured to the large diameter end portion of the housing 50. The outer rotor 51 is rotated around the center of axis of the housing 50 by engagement between the two tooth surfaces, responsive to the rotation of the inner rotor 52 according to the rotation of the rotary shaft 53, so as to increase the oil pressure introduced from the suction port 54 in the sealed state between the inner circumferential surface of the outer rotor 51 and the peripheral surface of the inner rotor 52, and to discharge to the oil tank 4 after being passed through a fixed throttle 57 and a check valve 58 formed at a portion of the housing 50. The vehicle speed sensor pump 5 thus constructed is secured to an outer wall 20 of the transmission gear 2 as shown in FIG. 2 so as to be rotated, by engaging a driven gear 59 including a helical gear and fit coaxially onto the other end portion of the rotary shaft 53, to a driving gear 22 including a helical gear and fit coaxially onto an output shaft 21 of the transmission gear 2, in the transmission gear 2, at a rotational speed responsive to the rotational speed of the output shaft 21 via the driving gear 22 and driven gear 59. Into the oil pressure control valve 6, oil pressure on the upstream side of a stationary orifice 57 is introduced. From the characteristic reason of the vehicle speed sensor pump 5 using the trochoid pump, this oil pressure corresponds to the rotational speed of the inner rotor 52, while oil pressure introduced into the oil pressure control valve 6 from the speed sensor pump 5 corresponds to the vehicle speed, since the rotational speed corresponds to the vehicle speed as aforementioned. As the speed sensor pump 5, it is not limited to the trochoid pump, all kinds of pumps which develop oil pressure corresponding to the rotational speed, such as a vane pump, gear pump, screw pump etc. may be used.

Figure 3:
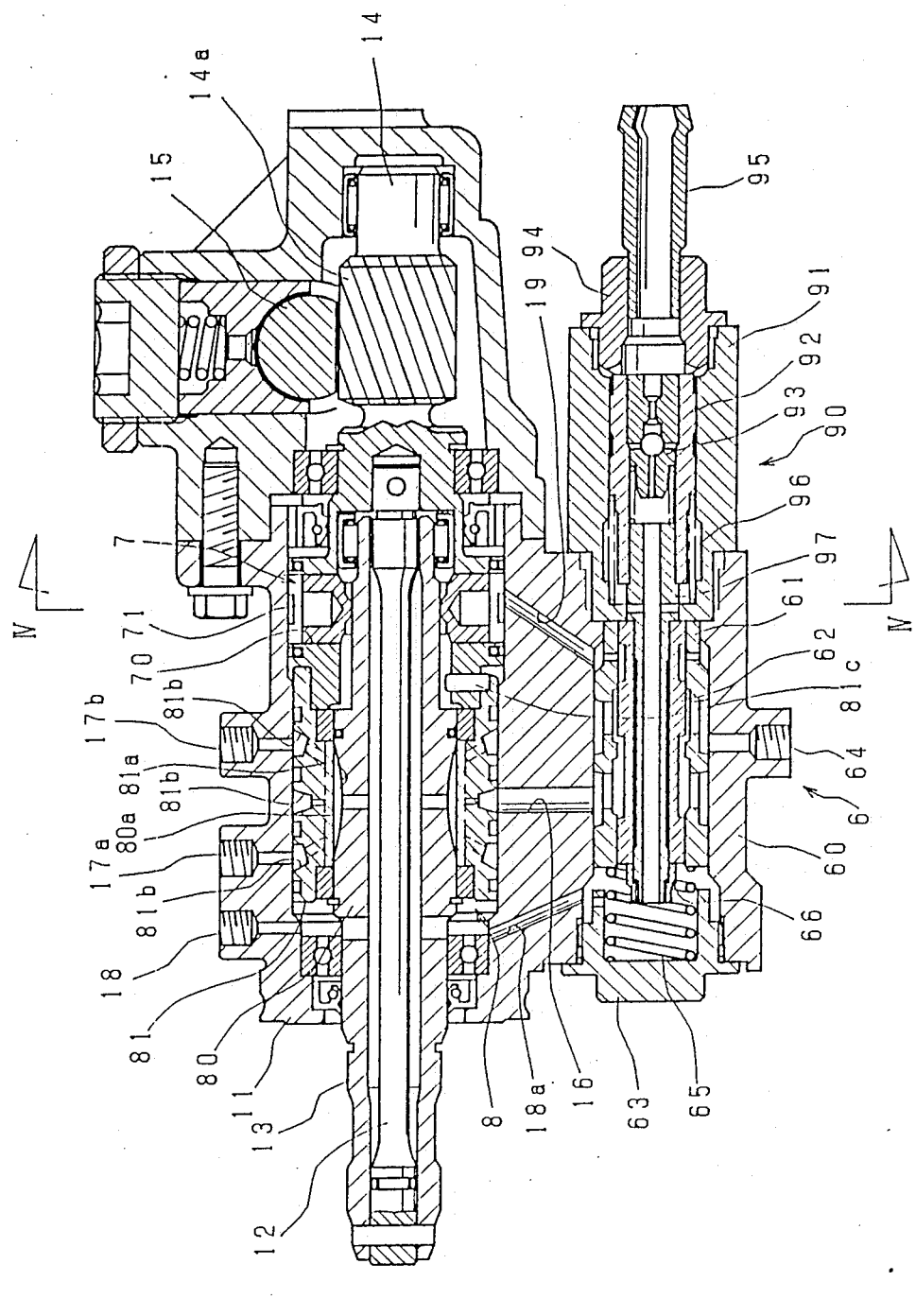
FIG. 3 is a longitudinal sectional view showing principal portions of a power steering apparatus according to the present invention.

FIG. 3 is a longitudinal sectional view of principal portions of a power steering apparatus according to the present invention, in which longitudinal cross sections of the directional control valve 8, constraining device 7 and oil pressure control valve 6 are included.

The directional control valve 8 is supported rotatably in a cylindrical housing 11 and constructed at a joint of an input shaft 13 and an output shaft 14 coupled coaxially via a torsion bar 12. The input shaft 13 is a hollow shaft rotating around the center of axis according to operation of the steering wheel 10, and connected thereto at its end portion projecting from the housing 11 via a connecting member not shown. In the output shaft 14, a pinion 14a having a helical gear formed on the peripheral surface near its one end portion, is engaged to a helical rack gear formed on the periphery of a rack shaft 15 in a steering mechanism. The output shaft 14 is a solid shaft which moves the rack shaft 15 axially according to its rotation around the center of the axis. The joint side end portion of the output shaft 14 and the input shaft 13 is formed cylindrically, and the end portion of the latter is inserted into the cylindrical portion and supported by a needle roller bearing. The directional control valve 8 comprises a valve body 80 and a casing 81. The valve body 80 is formed by disposing a plurality of elongated grooves 80a, 80a . . . extending axially in an equally spaced relation circumferentially on the peripheral surface of the input shaft 13 in the midway thereof. The casing 81 is a cylindrical member, in which the same number of elongated grooves 81a, 81a . . . as the elongated grooves 80a, 80a . . . extending axially are formed circumferentially in an equally spaced relation on its inner circumferential surface, and at the same time, three annular grooves 81b, 81b, 81b are formed on its peripheral surface. The casing 81 is inserted rotatably into the housing 11 so as to be engaged to the cylindrical end portion of the output shaft 14 by means of a pin 81c, and rotated around the center of axis in the housing 11 according to the rotation of the output shaft 14. The directional control valve 8 is so constructed that; the valve body 80 is inserted into the casing 81 so as to position the elongated grooves 80a, 80a . . . and the elongated grooves 81a, 81a . . . alternately and circumferentially, and to communicate respective elongated grooves 80a with the elongated grooves 81a, 81a adjacent to both sides thereof through very small gaps having a same width circumferentially.

In the directional control valve 8 thus constructed, between the elongated grooves 80a, 80a . . . of the valve body 80 and the inner circumferential surface of the casing 81, a plurality of spaces surrounded by the valve body 80 and the casing 81 are formed respectively. The same spaces are also formed between the elongated grooves 81a, 81a . . . of the casing 81 and the peripheral surface of the valve body 80. One half of the spaces of the former positioned alternately, are communicated with the annular groove 81b in the center around the casing 81 via a communicating passage extending radially through the casing 81. The rest are communicated with a hollow portion of the input shaft 13 via a communicating passage extending radially through the valve body 80. While, the spaces of the latter are communicated alternately with the annular grooves 81b, 81b which are positioned on both sides axially among the three annular grooves 81b, 81b, 81b around the casing 81, via communicating passages extending radially through the casing 81. Into the annular groove 81b in the center, pressured oil is introduced from the oil pressure control valve 6 constructed outside the housing 11 as to be described, via an oil conduit 16 formed in the housing 11. The annular grooves 81b, 81b on both sides are connected respectively to two oil chambers in the hydraulic cylinder 9 via oil outlet holes 17a, 17b formed in the housing 11 with openings on the outside. An oil discharge hole 18 connected to the oil tank 4 is also formed in the housing 11 with an opening on the outside. the oil discharge hole 18 is in communication with the hollow portion of the input shaft 13 in the housing 11.

Pressured oil introduced into the oil conduit 16 and the center from the oil pressure control valve 6 via the annular groove 81b is fed into the elongated groove 80a of the valve body 80, and further, passing through the gaps on both sides of the elongated grooves 80a and directed into the elongated grooves 81a, 81a . . . of the casing 81 adjacent thereto. When the steering wheel 10 is not operated and the relative angular displacement is not produced between the input shaft 13 interlocking with the steering wheel 10, and the output shaft rotating 14 interlockingly with movement of the rack shaft 15 in the steering mechanism or between the valve body 80 and the casing 81, gap areas on both sides of the elongated groove 80a are same and the same amount of pressured oil is introduced into the elongated grooves 81a, 81a. Thus, the pressure difference is not produced therebetween, so that there is no pressure difference between the two oil chambers of the hydraulic cylinder 9 communicating respectively therewith, and the assisting steering force is not generated in the hydraulic cylinder 9. This corresponds to the rectilinear driving state, in which the pressured oil in the elongated grooves 81a, 81a flows into respective elongated grooves 80a, 80a adjacent to the grooves 81a, 81a on the opposite side of the elongated hole 80a aformentioned, and circulates to the oil tank 4 passing through the hollow portion of the input shaft 13 and the oil discharge hole 18.

When the steering wheel 10 is operated for steering, the input shaft 13 is rotated accordingly. Since the output shaft 14 is constrained from rotation by the rack shaft 15 engaging therewith, the torsion bar 12 connecting the input and output shafts is distorted corresponding to steering torque applied to the steering wheel 10, and the relative angular displacement is produced between the valve body 80 and the casing 81. According to the relative angular displacement, the gap areas on both sides of the elongated groove 80a of the valve body 80 increase on one side and decrease on the other side. That is, pressure in the elongated groove 81a on the increased side of the area adjacent to the elongated hole 80a becomes higher than that in the elongated groove 81a adjacent to the other side. Thereby, the pressure difference responsive to the direction of the relative angular displacement, in other words, to the operating direction of the steering wheel 10 is produced between the two oil chambers of the hydraulic cylinder 9, which generates the auxiliary steering force.

Figure 4:
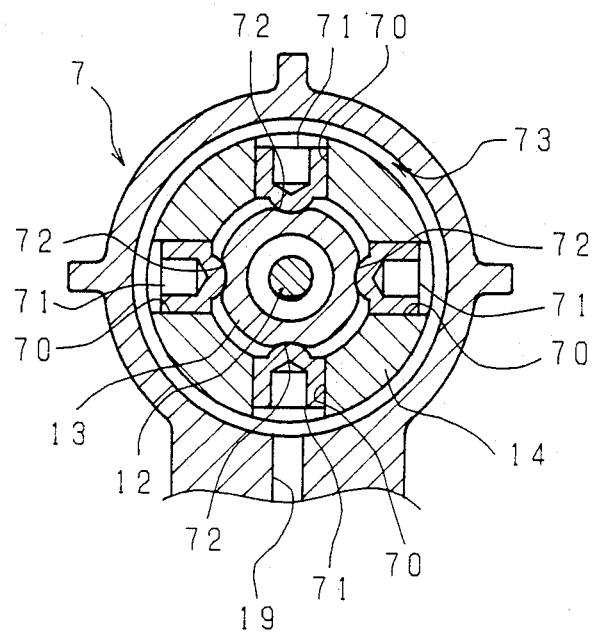
FIG. 4 is a transverse sectional view of a constraining device taken along the line IV—IV of FIG. 3.

As shown in FIG. 3 and FIG. 4 which is an enlarged transverse sectional view taken along the line IV—IV of FIG. 3, the constraining device 7 is constituted by inserting short cylindrical plungers 71, 71 . . . having a hemispherical end directed inwardly, slidably and axially into four guide holes 70, 70 . . . formed at positions spaced equally circumferentially on the cylindrical portion of the output shaft 14 and extending therethrough radially. At four locations spaced equally circumferentially on the peripheral surface of the input shaft 13 substantially corresponding axially to mounting positions of the plungers 71, 71 . . . , four recesses 72, 72 . . . having a semicircular axial section aligning substantially with the hemispherical end portion are formed. On the periphery of the cylindrical portion of the output shaft 14, an annular oil chamber 73 which communicates mutually with the guide holes 70, 70 . . . is formed. In the constraining device 7 thus constructed, oil pressure is introduced into the annular oil chamber 73 from the oil pressure control valve 6 via an oil passage 19 formed in the housing 11. The oil pressure acts on the outer end surfaces of respective plungers 71, 71 . . . to make them slide along respective guide holes 70, 70 . . . so as to bring respective hemispherical end portions to engage with the recesses 72, 72 . . . in the periphery of the input shaft 13. Consequently, the relative angular displacement between the input shaft 13 and output shaft 14 is constrained by a force corresponding to the oil pressure.

The oil pressure control valve 6 featuring the power steering apparatus according to the present invention comprises: a cylindrical casing 60 formed outside the housing 11 of the input and output shafts 13, 14 in parallel therewith, a main cylindrical spool 61 inserted slidably and axially into the casing 60, and an auxiliary cylindrical spool 62 inserted slidably and axially into the main spool 61. On one opening of the casing 60, a short cylindrical cover member 63 with bottom is screwed. On the other opening, a cylindrical casing 91 of a driving portion 90 which drives the auxiliary spool 62 is screwed coaxially therewith.

In the driving portion 90, a cylindrical pressure-driven piston 92 incorporating a relief valve 93 is inserted slidably and axially into the casing 91. In the driving portion 90, on an opening of the casing 91 on the opposite side of the connecting side with the casing 60 of the oil pressure control valve 6, a short cylindrical cover member 94 onto which an oil conduit 95 is secured at its axial center position is screwed. The pressure-driven piston 92 is exposed to a biasing force in the direction pressed against the end portion of the cover member 94 (rightward in FIG. 3) by a compression spring 96 interposed between the pressure-driven piston 92 and the casing 91. The pressure-driven piston 92 is also forced leftward in FIG. 3 by the oil pressure fed into the casing 90 from the oil conduit 95 and acting on the end surface on the side of cover member 94. The oil conduit 95 is connected to the discharge side of the vehicle speed sensor pump 5, and the pressure-driven piston 92, responsive to the difference between discharge pressure of the vehicle speed sensor pump 5 acting on the aforesaid end surface and the biasing force by the aforesaid compression spring 96, stops at the position where the two forces are balanced axially in the casing 91.

At the end portion of the pressure-driven piston 92 on the opposite side of the cover member 94, one end portion of a connecting pipe 97 is pressed and fixed in coaxial relation therewith. The other side of the connecting pipe 97 is extended into the casing 60 of the oil pressure control valve 6 and inserted through the auxiliary spool 62. The auxiliary spool 62 and the connecting pipe 97 are fixed integrally by means of a lock nut 66 engaging with the peripheral end of the connecting pipe 97 projecting by a suitable length from the end portion of the auxiliary spool 62. Thus, the auxiliary spool 62 moves axially in the oil pressure control valve 6 according to movement of the pressure-driven piston 92 in the driving portion 90. The pressure-driven piston 92 and the connecting pipe 97 may be constructed integrally as one component. The connecting pipe 97, however, is consisting of a long member having a reduced diameter as shown in the figure, so that when it is made into one component with the pressure driven piston 92, its processing becomes difficult. Moreover, when a portion corresponding to the pressure-driven pipe 92 is heat treated, there is a possibility of producing distortion in a portion corresponding to the connecting pipe 97, therefore it is desirable to construct them separately and integrate them into one piece by pressure insertion as aforementioned.

Figure 5:
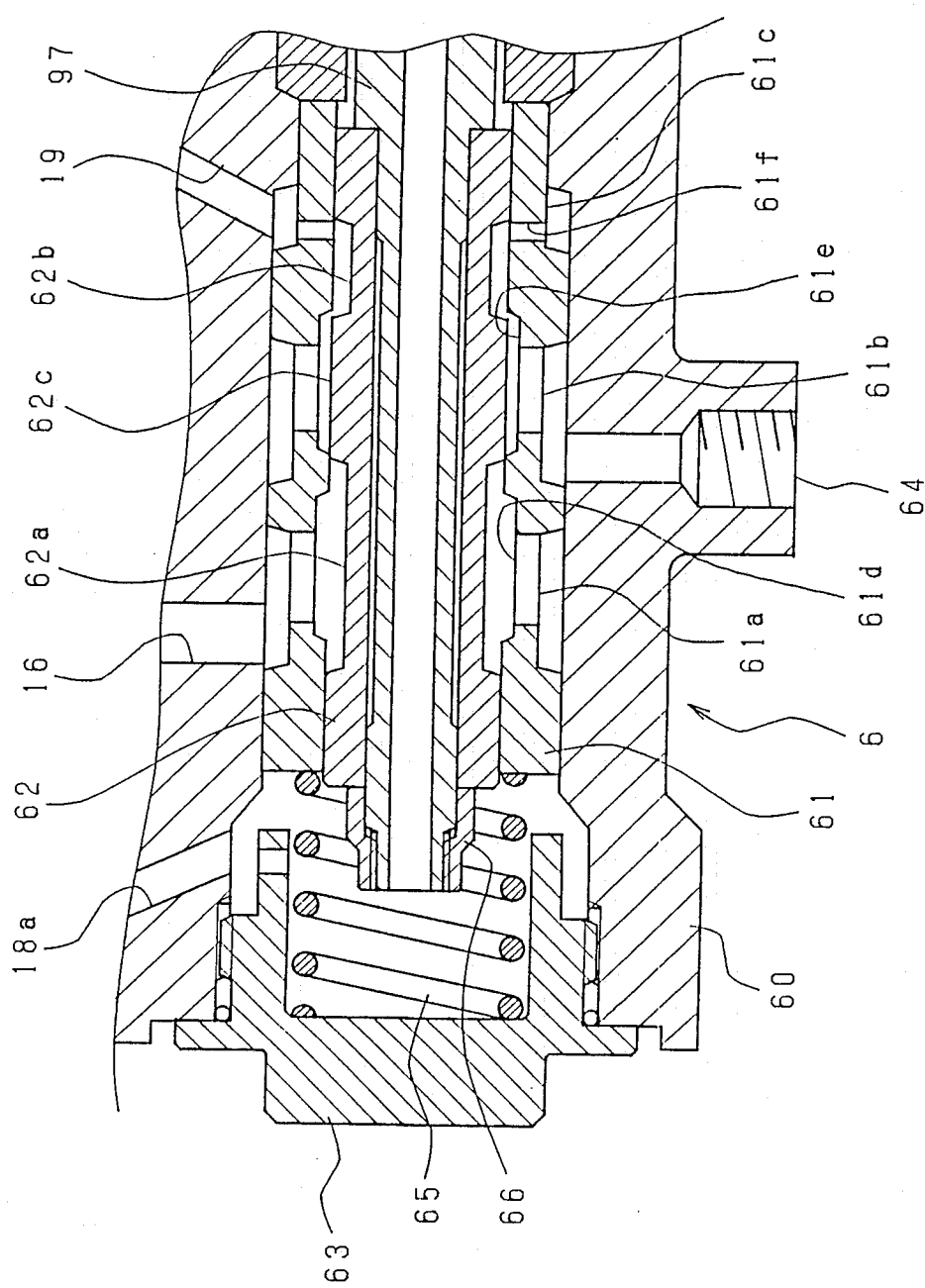
FIG. 5 is an enlarged sectional view of an oil pressure control valve featuring the present invention.

FIG. 5 is an enlarged sectional view of the oil pressure control valve 6 showing the auxiliary spool 62 positioned most leftwardly. As shown in the figure, an annular groove 61a having a predetermined width axially is formed on the peripheral surface a little close to one end of the main spool 61. On the peripheral surface in the center portion, an annular groove 61b having a predetermined width axially is similarly formed. Furthermore, around the other end portion, a reduced diameter portion 61c having an outside diameter smaller than the other portions is formed axially throughout the range having a predetermined length. On the inner circumferential surface of the main spool 61, annular grooves 61d, 61e having a predetermined length axially and communicating respectively with the annular grooves 61a, 61b are formed at two locations spaced in a predetermined length axially. The main spool 61 is movable slidably in the casing 60, from the position where the end surface of the reduced diameter portion 61c contacts with the end surface of the casing 91 of the driving portion 90 projecting into the casing 60, to the position where the other end surface contacts with the end surface of the cover member 63 projecting into the casing 60. The forming position and width of the annular groove 61a are set as such that, the opening of the oil conduit 16 inside the casing 60 is included within its forming range if the main spool 61 exists at any position within the moving range. Thus, irrespective of the moving position of the main spool 61, pressured oil in the annular groove 61a is fed into the directional control valve 8 via the oil conduit 16. The forming position and width of the annular groove 61b are also set as such that, the opening of the oil inlet hole 64 formed in the casing 60 as extending radially therethrough inside the casing 60 is included within forming range of the annular groove 61b if the main spool 61 exists at any position within the moving range. The oil inlet hole 64 is connected to the discharge side of the hydraulic pump 3, and operating oil of the power steering apparatus discharged from the hydraulic pump 3 is directed into the annular groove 61b via the oil inlet hole 64 irrespective of the moving position of the main spool 61, and further introduced into the annular groove 61e communicating with the annular groove 61b. The axial forming range of the reduced diameter portion 61c is set as such that, the opening of the oil passage 19 in the casing 60 is included within the forming range of annular spaces formed between the reduced diameter portion 61c and the peripheral surface of the casing 60 if the main spool exists 61 at any position within the moving range. The reduced diameter portion 61c is in communication with the inside of the main spool 61 via a communicating oil passage 61f formed adjacent to the border with the other portion as extending radially through the main spool 61. Thus, the oil pressure directed into the annular spaces via the communicating oil passage 61f is introduced into the constraining device 7 via the oil passage 19.

The main spool 61 thus constructed is forced rightward in FIGS. 3 and 5 in the casing 60 by a compression spring 65 interposed between the main spool 61 and the cover member 63. While, spaces formed between the main spool 61 and the cover member 63 are in communication with the hollow portion of the input shaft 13 in the housing 11, via a communicating passage 18a formed as extending radially through the housing 11. Thus, the spaces are kept in a low pressure state approximately same as the pressure in the oil tank 4 which is in communication with the hollow portion via the oil discharge hole 18, and this low pressure acts on the end surface of the main spool 61 on the side of the cover member 63. On an annular shoulder portion formed between the reduced diameter portion 61c and the other portion of the main spool 61, as previously described, pressure of the pressured oil introduced into the constraining device 7 acts leftward in FIGS. 3 and 5. Thus, the main spool 61 moves slidably and axially responsive to the difference between the pressure acting on the annular shoulder portion and the biasing force by the compression spring 65, and stops at the position where the two forces are balanced. That is, as shown in FIGS. 3 and 5, when the oil pressure introduced into the constraining device 7 is lower, the main spool 61 is in the state wherein the end surface of the reduced diameter portion 61c contacts the end surface of the casing 91 of the driving portion 90, and moves leftward as the oil pressure introduced into the constraining device 7 rises.

Meanwhile, the auxiliary spool 62 is a cylindrical member onto which annular grooves 62a, 62b having a predetermined width axially are formed respectively at two locations spaced in predetermined length axially on its peripheral surface. As previously described, the auxiliary spool 62 is designed to move axially as sliding along the inner circumferential surface of the main spool 61 responsive to movement of the pressure-driven piston 92 in the driving portion 90. The moving range of the auxiliary spool 62 is, from the position where one end surface of the pressure-driven piston 92 contacts with the end surface of the cover member 94 in the casing 91, to the position where the other end surface of the pressure-driven piston 92 contacts with the inner wall of the casing 91 on the opposite side of the fixed end of the cover member 94. The forming position and width of the annular groove 62a are set as such that, the groove 62a communicates with the annular grove 61d inside the main spool 61 if the auxiliary spool 62 exits at any position within the moving range. The forming position and width of the other annular groove 62b are similarly set as such that, the communicating oil passage 61f formed in the main spool 61 is included within forming range of the annular groove 62b. A projection 62c formed between the annular grooves 62a, 62b by the peripheral surface of the auxiliary spool 62 is so arranged that, its axial length is slightly shorter than the width of the annular groove 61e. Through gaps formed between the main spool 61 and the auxiliary spool 62 on both sides of the projection 62c, the annular grooves 62a and 62b are brought in communication with the annular groove 61e respectively. Communicating areas in these gaps change responsive to the relative positional relation between the main and auxiliary spools 61, 62. For example, as shown in FIG. 3, when the main spool 61 and auxiliary spool 62 are both positioned on the most rightward side within their moving range, contrary to a large communicating area is produced on the annular grove 62a side, the gap on the annular groove 62b side is nearly zero. Thus, the annular groove 62b and the annular groove 61e are just communicated through a small gap between the inner circumferential surface of the main spool 61 and the peripheral surface of the auxiliary spool 62. While, as shown in FIG. 5, when the main spool 61 is positioned on the most rightward side and the auxiliary spool 62 on the most leftward side, contrary to a large communicating area is produced on the annular groove 62b side, the communicating area on the annular groove 62a side is almost zero. That is, the communicating area on the annular groove 62a side increases as the main spool 61 moves left-ward and the auxiliary spool 62 moves rightward, conversely the communicating area on the annular grove 62b side increases as the main spool 61 move rightward and the auxiliary spool 62 moves leftward. As previously described, the annular groove 61e is always brought in communication with the discharge side of the hydraulic pump 3 via the annular groove 61b outside the main spool 61 and the oil inlet hole 64. The annular grooves 62a and 62b are respectively brought in communication with the directional control valve 8 and the constraining device 7, via the continuously communicating annular groove 61d and communicating passage 61f, annular groove 61a and reduced diameter portion 61c, and oil conduit 16 and oil passage 19. Thus, the gaps on both sides of the projection 62c serve as variable throttles interposed respectively between the hydraulic pump 3 and the directional control valve 8 and between hydraulic pump 3 and the constraining device 7. Oil pressure fed to the directional control valve 8 increases as the communicating area in the gap on the annular groove 62a side increases, in other words, as the rightward relative movement of the auxiliary spool 62 relative to the main spool 61 increases. Oil pressure introduced into the constraining device 7 increases as the communicating area in the gap on the annular grove 62b side increases, in other words, as the leftward movement of the auxiliary spool 62 relative to the main spool 61 increases.

Now, in the power steering apparatus according to the present invention, responsive to movements of the main spool 61 and the auxiliary spool 62 of the oil pressure control valve 6 constructed as aforementioned, gap areas formed between the two spools and serving as the variable throttles are changed corresponding to the vehicle speed. Thereby, oil pressure directed into the hydraulic cylinder 9 and constraining device 7 via the directional control valve 8 is controlled automatically.

The operations will now be explained according to moving modes of the main spool 61 and auxiliary spool 62.

The main spool 61 of the oil pressure control valve 6, as previously described, moves responsive to oil pressure acting on the annular shoulder portion formed between the reduced diameter portion 61c and the other portion of the main spool 61. The oil pressure is approximately as same as that in one annular groove 62b around the auxiliary spool 62 communicating with the reduced diameter portion 61c via the communicating oil passage 61f. The oil pressure in the annular groove 62b is developed, when oil pressure introduced into the annular groove 61e around the inner surface of the main spool 61 from the hydraulic pump 3, via the oil inlet hole 64 and the annular groove 61b around the main spool 61, is reduced when passing through a gap between the annular grooves 61e and 62b (hereinafter referred to as a first throttle portion). The oil pressure increases as the flow resistance in the fist throttle portion reduces. While, when the opening area of the first throttle portion is constant, it responds to changes of oil pressure in the annular groove 61e. As previously described, the annular groove 61e is in communication with the other annular groove 62a around the auxiliary spool 62 via a gap (hereinafter referred to as a second throttle portion) on the opposite side of the aforesaid gap. Since the annular groove 62a is in communication with the directional control valve 8 via the oil conduit 16, when the second throttle portion area is constant, the oil pressure in the annular groove 61e responds to changes of the flow resistance in the directional control valve 8. Flow resistance in the directional control valve 8, as previously described, increases responsive to increase of the relative angular displacement produced between the valve body 80 and the casing 81, when steering torque is applied to the steering wheel 10 and the torsion bar 12 is distorted responsive thereto. Thus, the main spool 61 is positioned in the most rightward side within the moving range as shown in FIGS. 3 and 5, when steering torque is not applied to the steering wheel 10 or in the rectilinear driving state. When more than a predetermined amount of steering torque is applied to the steering wheel 10, and oil pressure in the reduced diameter portion 61c which changes responsive thereto, reaches the level to cope with a biasing force of the compression spring 65, the main spool 61 moves leftward responsive to the magnitude of the steering torque.

Meanwhile, the auxiliary spool 62 of the oil pressure control valve 6 moves according to movement of the pressure-driven driven piston 92 in the driving portion 90 as aforementioned. The pressure-driven piston 92 moves leftward in FIG. 3, responsive to the difference between discharge pressure of the speed sensor pump 5 directed into the casing 91 of the driving portion 90 and the biasing force applied thereto by the compression spring 96. Thus, when the rotational speed of the vehicle speed sensor pump 5 is low, and its discharge pressure is below the level to cope with the biasing force of the compression spring 96 as in the case of low speed driving or standstill, the auxiliary spool 62 stops in the most rightward position within the moving range as shown in FIG. 3. When the vehicle speed increases and the discharge pressure of the vehicle speed sensor pump 5 which increases responsive thereto, reaches the level to cope with the biasing force of the compression spring 96, the auxiliary spool 62 moves leftward as the vehicle speed increases.

As described heretofore, since the main and auxiliary spools 61, 62 of the oil pressure control valve 6 move, at low speed rectilinear driving, the relative positional relation between the main spool 61 and the auxiliary spool 62 is in the state shown in FIG. 3. That is, the first throttle portion is closed, and the annular grooves 61e and 62b are just communicated with each other via a small gap between the inner circumferential surface of the main spool 61 and the peripheral surface of the auxiliary spool 62. On the contrary, since the second throttle portion has a sufficient opening area, pressured oil introduced into the annular groove 61e from the hydraulic pump 3 via the oil inlet hole 64 and annular groove 61b, flows mostly into the annular groove 62a through the second throttle portion, and further directed into the directional control valve 8 via the annular grooves 61d and 61a of the main spool 61 and the oil conduit 16. At this time, oil pressure in the annular groove 61b and the reduced diameter portion 61c communicating with the annular groove 61b via the communicating oil passage 61f, is developed by reducing the oil pressure in the annular groove 61e largely in the first throttle portion. Thus, the oil pressure introduced into the constraining device 7 which is brought in communication with the reduced diameter portion 61c via the oil passage 19 is low, and plungers 71, 71 . . . of the constraining device 7 are just pressed against the periphery of the input shaft 13 by a small force, therefore the input shaft 13 and the output shaft 14 are in the state where the relative angular displacement can be produced easily. Accordingly, when steering torque is applied to the steering wheel 10 at this state, the pressured oil from the hydraulic pump 3 is fed into a corresponding oil chamber in the hydraulic cylinder 9 for assisting steering by the aforesaid operation of the directional control valve 8. Consequently, the vehicle is steered by the force generated in the hydraulic cylinder 9, and the driver is required just to apply the force necessary for produce producing distortion on the torsion bar 12 to the steering wheel 10 for steering, thus the force required for steering operation can be considerably reduced. In this case, as previously described, though oil pressure in the annular groove 61e rises responsive to operation of the steering wheel 10, since the first throttle portion is closed, oil pressure in the annular groove 62b hardly changes, and oil pressure acting on the annular shoulder portion of the reduced diameter portion 61c does not exceed the biasing force generated by the compression spring 65, so the constraining device 7 does not generate the constraining force.

While, at high speed rectilinear driving, the relative positional relation between the main and auxiliary spools 61, 62 is in the state shown in FIG. 5. That is contrary to the second throttle portion which is almost closed, the first throttle portion has a sufficient opening area. Thus, oil pressure introduced into the annular groove 61e from the hydraulic pump 3 successively through the oil inlet hole 64 and annular groove 61b, is directed into a space between the reduced diameter portion 61c and the inner circumferential surface of the casing 60 via the annular groove 62b and communicating oil passage 61f. Furthermore, since it is introduced into the constraining device 7 communicating with the space via the oil passage 19, the plungers 71, 71 . . . are advanced by the oil pressure so as to engage with the recesses 72, 72 . . . formed around the input shaft 13, thus the relative angular displacement between the input shaft 13 and the output shaft 14 is constrained. Accordingly, when steering torque is applied to the steering wheel 10 in this state, the torsion bar 12 is not distorted by the torque, and switching operation of the feeding direction of pressured oil by the directional control valve 8 is not effected. The output shaft 14 is rotated directly by the torque via the constraining device 7, and same rigidity as the manual steering is applied to the steering wheel 10, thus the driving stability at rectilinear driving is improved.

Also in this case, pressured oil is fed into the directional control valve 8 through a small gap in the second throttle portion. Thus, when the steering torque surpassing the constraining force generated by the constraining device 7 is applied to the steering wheel 10, and when the relative angular displacement is produced between the valve body 80 and the casing 81 of the directional control valve 8, oil pressure in the annular groove 61e of the oil pressure control valve 6 rises as the flow resistance of the pressured oil in the directional control valve 8 increases. Consequently, oil pressure at the reduced diameter portion 61c also rises and the constraining device 7 generates the larger constraining force to constrain switching operation of the feeding direction of pressured oil in the directional control valve 8. However, when oil pressure at the reduced diameter portion 61c exceeds a predetermined value, and this oil pressure acting on the annular shoulder portion becomes higher than the biasing force of the compression spring 65, the main spool 61 moves leftward responsive thereto and the first throttle portion is closed. If the first throttle portion closes, feeding pressure to the constraining device 7 does not become higher than this, and the constraining force generated by the constraining device 7 stays below the predetermined magnitude, thereafter the hydraulic cylinder 9 generates the auxiliary steering force, so that the steering wheel 10 does not become heavier more than necessary. Oil pressure which generates the predetermined magnitude constraining force changes responsive to size the opening area of the first throttle portion in the rectilinear state. The opening area changes responsive to the moving position of the auxiliary spool 62 which moves responsive to the discharge pressure of the vehicle speed sensor pump 5, and becomes larger or smaller responsive to the vehicle speed. Thus, in the power steering apparatus according to the present invention, suitable rigidity responsive to the vehicle speed is given to the steering wheel 10 which becomes heavier as the vehicle speed increases, for comfortable steering sensation.

Figure 6:
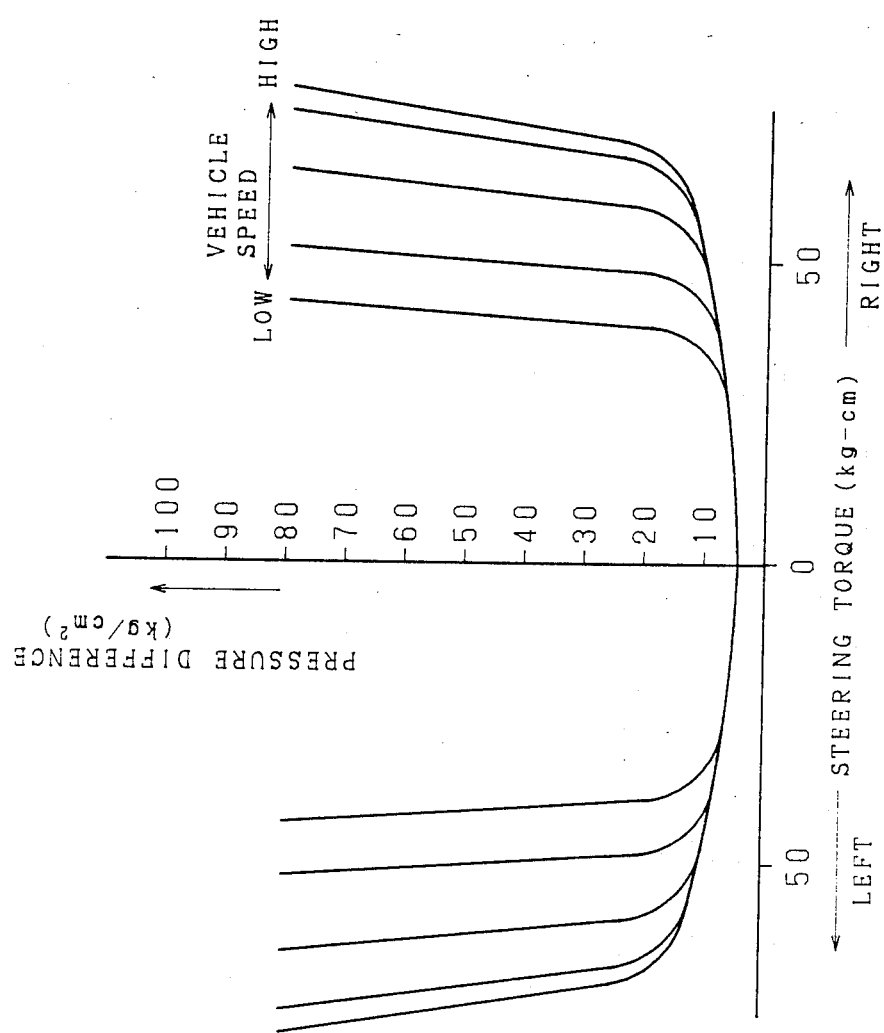
FIG. 6 is a graph showing the relationship between steering torque applied to a steering wheel, and the pressure difference developed in a hydraulic cylinder for assisting steering in a power steering apparatus according to the present invention.

FIG. 6 is a graph showing detected results of the relationship between steering torque applied to the steering wheel 10, and the pressure difference developed between two oil chambers of the hydraulic cylinder 9 responsive thereto, in the power steering apparatus according to the present invention, measured at various vehicle speeds, from which it is also clear that characteristics as aforementioned is obtained.

As particularly described heretofore, in the power steering apparatus according to the present invention, the auxiliary spool of the oil pressure control valve moves responsive to oil pressure corresponding to the vehicle speed produced by the vehicle speed sensor pump, and the opening area of the variable throttle is changed as the relative positional relation between the auxiliary spool and the main spool changes by this movement to adjust oil pressure introduced into the constraining device, thereby the constraining device generates the constraining force which becomes larger or smaller responsive to the vehicle speed, so that there is no possibility of sudden change of the constraining force caused by external disturbance signals such a electromagnetic waves and the constraining force corresponding reliably to the vehicle speed is obtained, results in such a superior effect as preventing accidents caused by the sudden change of steering sensation.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A power steering apparatus comprising:
a hydraulic cylinder for generating a force assisting a steering force, a directional control valve having a casing and a valve body rotating relatively according to steering operation, and switching the feeding direction of pressured oil to said hydraulic cylinder responsive to the direction of relative rotation, a constraining device operated by pressured oil and applying a constraining force between said casing and valve body to constrain said relative rotation responsive to the oil pressure, a vehicle speed sensor pump rotated at a speed proportional to the vehicle speed and developing oil pressure corresponding to the rotational speed, an oil pressure control valve for controlling the oil pressure fed to said directional control valve and constraining device responsive to oil pressure developed by said vehicle speed sensor pump, said oil pressure control valve comprises a cylindrical casing provided with first and second communicating ports communicating separately with said constraining device, and said oil pressure control valve controls said oil pressure fed to said constraining device by forming first and second variable throttles communicating separately with said first and second communicating ports.

2. A power steering apparatus as set forth in claim 1, wherein said vehicle speed sensor pump is a trochoid pump.

3. A power steering apparatus as set forth in claim 1, wherein said oil pressure control valve further comprises:

a cylindrical main spool inserted into said cylindrical casing and sliding axially responsive to oil pressure fed to said constraining device, and an auxiliary spool inserted into said main spool an sliding axially responsive to oil pressure developed by said vehicle speed sensor pump, said first and second variable throttles being disposed between said main spool and said auxiliary spool, and said oil pressure control valve changing opening areas of said first and second variable throttles responsive to the relative displacement between said two spools in such a manner that, one side becomes smaller when the other side becomes larger.

4. A power steering apparatus as set forth in claim 3, wherein said oil pressure control valve enlarges the opening area of a first variable throttle communicating with a first communicating port as the vehicle speed increases, and controls to increase the oil pressure fed to said constraining device.

5. A power steering apparatus as set forth in claim 4, wherein said oil pressure of said oil pressure control valve fed to said constraining device is at a maximum, when said first variable throttle whose maximum opening area is decided responsive to the vehicle speed, is closed by sliding movement of said main spool corresponding to the oil pressure fed to said constraining device.

6. A power steering apparatus comprising:

a hydraulic cylinder for generating a force assisting a steering force;

a directional control valve having a casing and a valve body rotating relatively according to steering operation, and switching the feeding direction of pressured oil to said hydraulic cylinder responsive to the direction of relative rotation;

a constraining device operated by pressured oil and applying a constraining force between said casing and valve body to constrain said relative rotation responsive to the oil pressure;

a vehicle speed sensor pump rotated at a speed proportional to the vehicle speed and developing oil pressure corresponding to the rotational speed;

an oil pressure control valve for controlling the oil pressure fed to said directional control valve and constraining device wherein oil pressure fed to said constraining device is responsive to oil pressure developed by said vehicle speed sensor pump, and oil pressure fed to said directional control valve is responsive to oil pressure fed to said constraining device, said oil pressure control valve comprises a cylindrical casing provided with first and second communicating ports communicating separately with said constraining device, and said oil pressure control valve controls said oil pressure fed to said constraining device by forming first and second variable throttles communicating separately with said first and second communicating ports.

7. A power steering apparatus as set forth in claim 6, wherein said vehicle speed sensor pump is a trochoid pump.

8. A power steering apparatus as set forth in claim 6, wherein said oil pressure control valve further comprises:

a cylindrical main spool inserted into said cylindrical casing and sliding axially responsive to oil pressure fed to said constraining device, and an auxiliary spool inserted into said main spool and sliding axially responsive to oil pressure developed by said vehicle speed sensor pump, said first and second variable throttles being disposed between said main spool and said auxiliary spool, and said oil pressure control valve changing opening areas of said first and second variable throttles responsive to the relative displacement between said two spools in such a manner that, one side becomes smaller when the other side becomes larger.

* * * * *